(12) United States Patent
Thompson et al.

(10) Patent No.: US 9,177,297 B2
(45) Date of Patent: Nov. 3, 2015

(54) DISTRIBUTING DATA MESSAGES TO SUCCESSIVE DIFFERENT SUBSETS OF GROUP MEMBERS BASED ON DISTRIBUTION RULES AUTOMATICALLY SELECTED USING FEEDBACK FROM A PRIOR SELECTED SUBSET

(75) Inventors: Simon G Thompson, Suffolk (GB); Cefn R Hoile, Suffolk (GB); Mark A Shackleton, Suffolk (GB)

(73) Assignee: British Telecommunications PLC, London (GB)

( * ) Notice: Subject to any disclaimer, the term of this patent is extended or adjusted under 35 U.S.C. 154(b) by 1349 days.

(21) Appl. No.: 12/593,801

(22) PCT Filed: Mar. 26, 2008

(86) PCT No.: PCT/GB2008/001039
§ 371 (c)(1),
(2), (4) Date: Sep. 29, 2009

(87) PCT Pub. No.: WO2008/119944
PCT Pub. Date: Oct. 9, 2008

(65) Prior Publication Data
US 2010/0100600 A1 Apr. 22, 2010

(30) Foreign Application Priority Data
Mar. 29, 2007 (EP) ..................... 07251361

(51) Int. Cl.
*G06F 15/16* (2006.01)
*G06F 15/173* (2006.01)
*G06F 15/177* (2006.01)
*G06Q 10/10* (2012.01)

(52) U.S. Cl.
CPC .................. *G06Q 10/107* (2013.01)

(58) Field of Classification Search
CPC .............. H04L 63/1416; H04L 63/145; H04L 63/0245; G06Q 10/107
USPC .................................. 709/206, 227
See application file for complete search history.

(56) References Cited

U.S. PATENT DOCUMENTS

| 2004/0143476 | A1* | 7/2004 | Kapadia et al. | 705/9 |
| 2006/0168040 | A1* | 7/2006 | Kushmerick et al. | 709/206 |
| 2006/0230037 | A1* | 10/2006 | Sugiyama et al. | 707/6 |
| 2007/0160963 | A1* | 7/2007 | Diaz et al. | 434/219 |
| 2007/0168342 | A1* | 7/2007 | Singerman et al. | 707/5 |

(Continued)

OTHER PUBLICATIONS

International Search Report for PCT/GB2008/001039, mailed May 7, 2008, pp. 1-4.

*Primary Examiner* — Haresh N Patel
(74) *Attorney, Agent, or Firm* — Nixon & Vanderhye PC

(57) ABSTRACT

A method of automatically distributing data messages to members of a user community involves selecting, from a list of distribution rules, a rule which meets certain criteria in terms of message distribution characteristics. The selected rule determines which members of the user community will receive the message and when. For example, in a first round, a first subset of the user community receive the message and each is prompted to provide feedback data in relation to the message, for example to say that the message is offensive, already answered or if there is someone else who can deal with the message. This feedback data is applied to the selected distribution rule to determine to whom the message is sent in the next round. The process continues over a number of rounds until a termination criterion is met.

11 Claims, 5 Drawing Sheets

(56) References Cited

U.S. PATENT DOCUMENTS

| | | | |
|---|---|---|---|
| 2008/0172415 A1* | 7/2008 | Fakhari et al. | 707/104.1 |
| 2008/0206725 A1* | 8/2008 | Diaz et al. | 434/219 |
| 2008/0215697 A1* | 9/2008 | Kushmerick et al. | 709/206 |
| 2009/0259566 A1* | 10/2009 | White et al. | 705/26 |

\* cited by examiner

FIRST ROUND  SECOND ROUND  THIRD ROUND

Figure 6

DISTRIBUTING DATA MESSAGES TO SUCCESSIVE DIFFERENT SUBSETS OF GROUP MEMBERS BASED ON DISTRIBUTION RULES AUTOMATICALLY SELECTED USING FEEDBACK FROM A PRIOR SELECTED SUBSET

This application is the U.S. national phase of International Application No. PCT/GB2008/001039 filed 26 Mar. 2008, which designated the U.S. and claims priority to European Application No. 07251361.7 filed 29 Mar. 2007, the entire contents of each of which are hereby incorporated by reference.

BACKGROUND

1. Technical Field

The invention relates to a method and system for distributing data messages to members of a user community over a data network.

2. Related Art

It is common for people to exchange data messages with members of a user community using computer networks. For example, there are numerous online fora accessible to anyone having Internet access. Members of such fora are able to post messages on a particular subject with a view to giving an opinion or for seeking advice or an answer to a question. For example, there are numerous fora providing online support in relation to particular technologies, e.g. computer applications. When a message is submitted, it may be posted on a website for all members to view. In an alternative mechanism, messages can be sent direct, e.g. by email, to just a subset of the community. This can be preferable since it avoids cluttering the website with messages likely to be of interest to just a small section of the community and is also likely to yield faster responses since messages are sent direct to members without requiring them to view and read the numerous messages on the website. The subset may be chosen at random or based on user-selected attributes, e.g. whether their job title is relevant to the message subject. If a member of the initial subset has no interest in the message, they may forward the message to someone they consider more suitable.

This application relates to this latter type of data message exchange, namely where data messages are sent to a subset of members via some personal address rather than by posting data messages to everyone on a general website.

It has been proposed to distribute messages automatically in respective propagation stages/rounds using a computer system employing a distribution policy or rule that determines characteristics such as which members of the computer-based user community the message will be sent to, how many rounds there will be, and so on. In a given user community, however, members will have rather different requirements and whilst a particular rule may define an optimal distribution policy for a particular application at a particular time, this is unlikely to remain true as circumstances change.

For example, consider a message distribution list set up to enable information to be exchanged on a major project, such as The Olympic Games. As the event draws near, parties such as planning officials, engineers and civil servants may retain an interest in the project but their own roles will diminish and so their preferences are likely to move from wanting to see all messages having some relevance to only seeing those that are particularly pertinent. On the other hand, parties such as athletes and coaches will become more interested as the event date approaches. As the event occurs, both groups will undergo another change in preference.

BRIEF SUMMARY

According to a first aspect of the invention, there is provided a computer-implemented method for distributing messages to members of a user community over a data network, the method comprising: (a) storing a plurality of distribution rules, each rule comprising a respective set of instructions for enabling a processor to determine subsets of members to whom a data message is to be transmitted; (b) selecting a first distribution rule and sending a first data message to a first subset of members over said data network in accordance with said first rule; (c) receiving feedback data in respect of the first data message from one or more of the first subset of members; and (d) automatically selecting a second distribution rule in dependence on the feedback data received in (c) in respect of the first data message, the selected second rule being assigned for use in sending a second data message to a second, different, subset of members over said data network.

Such a method enables automatic adaption and optimization of message distribution policies with a view to satisfying the changing requirements of members over time. Such a method can offer particular advantages since (1) the space of possible distribution policies is very large and such automated systems enable parts of this space to be explored and evaluated in terms of effectiveness and (2) as the purpose of messaging systems change, adaption of distribution policies enables such changes to be incorporated in the same system without significant modification. A messaging system employing such an operating method is able to handle message distribution without human intervention.

Step (b) may comprise sending the first message to different subsets of members in respective distribution rounds, selection of the second distribution rule in (d) being dependent on feedback data received in respect of each round. The distribution rules preferably determine which members comprise respective member subsets in dependence on feedback data received in respect of a previous distribution round.

Selection of the distribution rule in (d) can comprise selecting, from the plurality of distribution rules, the rule which meets a predefined criterion or criteria in terms of the received feedback. The plurality of distribution rules comprise a ranked list reflecting a fitness score calculated for each rule in accordance with the received feedback, the predetermined criterion defining which rank is selected. A new distribution rule may automatically be added to the existing plurality of distribution rules prior to sending the second, subsequent, message. The new distribution rule may replace one of the distribution rules in the set according to a predetermined replacement rule. The replaced distribution rule could be that which has the lowest fitness score. The new distribution rule can be generated automatically using a rule generating algorithm and comprises one or more modified attributes of an existing distribution rule.

According to a second aspect of the invention, there is provided a computer-implemented method for distributing data messages to members of a user community over a data network, the method comprising: (a) storing a plurality of distribution rules, each rule being arranged, when executed by a processing means, to determine a subset of members to whom a message is to be transmitted in dependence on feedback data received from one or more other members in respect of a particular message; (b) selecting a first distribution rule; (c) sending a first data message to different subsets of the user community in respective distribution rounds, members in at least one round being prompted to provide feedback data in respect of the data message, receipt of feedback data being used by a processing means in association with the first distribution rule automatically to determine the subset of members to whom the message is sent in a subsequent round; and (d) selecting a different distribution rule for use in sending a second, subsequent, data message over the data network, selection of the different distribution rule being dependent on a predetermined rule selection algorithm which takes as input the feedback data received in respect of each round of the first message.

According to a third aspect of the invention, there is provided a system arranged to distribute messages to members of a user community using a data network, the system comprising: means arranged to access a plurality of distribution rules for determining a subset of members to whom a message is to be transmitted; selecting means arranged to select a first distribution rule and to send a first message to a first subset of members in accordance with said first rule; means arranged to receive feedback data in respect of first message from one or more of the first subset of members; and means arranged automatically to select a second distribution rule in dependence on the feedback data received and to send a second message to a different subset of members in accordance with said second rule.

In the preferred embodiment, a messaging system propagates messages to different subsets of members in different stages, or rounds, while utilizing feedback from members of a particular subset to automatically determine membership of the next subset. In this way, messages need not be sent to a large number of people to get a quick response (potentially wasting processing resources, storage and bandwidth, not to mention annoying people having no interest in the message subject). Rather, we can choose to start with a relatively small subset and use the feedback from one or more of these members to propagate messages in a controlled and automated way to further subsets until terminating criteria are satisfied. The choice of members initially chosen is also less critical and can be automated.

A user community is considered to comprise a plurality of members identifiable as belonging to a particular forum or community, e.g. through self-registration or by virtue of them being members of a company or organization. The members may comprise, for example, employees of a company or group of companies, or simply a set of users who have registered with a messaging group. A subset is one or more members of the community whose number is less than the whole community.

A round is considered a discrete stage in the distribution process in which (i) the message is sent to members of a subset and (ii) it is possible to determine membership of the next subset using the feedback data.

BRIEF DESCRIPTION OF THE DRAWINGS

The invention will now be described, by way of example, with reference to the accompanying drawings in which:

FIG. 6 is a screenshot of an e-mail message distributed by the messaging system shown in FIG. 5, the message including selection buttons for generating feedback data.

DETAILED DESCRIPTION OF EXEMPLARY EMBODIMENTS

The preferred embodiment comprises a message distribution system which implements a message distribution algorithm, which is most likely to be implemented in software stored on a computer readable medium. The system includes a processor and storage means, the latter being arranged to store a plurality of different distribution rules which determine how a particular message is to be distributed in successive rounds. The storage means also stores one or more selection rules determining which of the distribution rules is to be selected for use with a subsequent message. This is primarily based on feedback data received when the particular distribution rule was applied; a fitness score for each distribution rule is periodically generated and so the selection score applies an algorithm on the basis of the fitness score.

Overview

A key feature of this embodiment is the use, in a computer system, of feedback data from members of a user community to decide how a data message, for example an email, is to be propagated in subsequent stages or rounds. A simple example of how feedback can be usefully employed will now be described.

Figure 1:
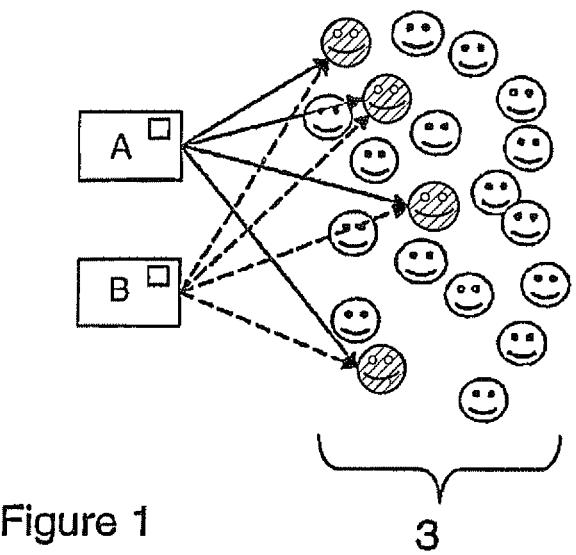
FIG. 1 is a schematic diagram showing how first and second messages are transmitted to members of a user community.

Consider the situation where two messages, A and B, are sent to members of an online user community 3. We assume message A is a work-related query, e.g. 'who should we invite to a meeting regarding this technology?' whilst message B is a spam message having no relevance to the user community. FIG. 1 represents how a prior art system would distribute both messages to a predefined list of manually-selected members. All of the members that receive message B will be annoyed by receiving this so-called spam message. Three of the members who received message A are also inconvenienced since it happens to be of no relevance to them. Only one user is not inconvenienced to get message A and can take appropriate action by answering the message.

Figure 2:
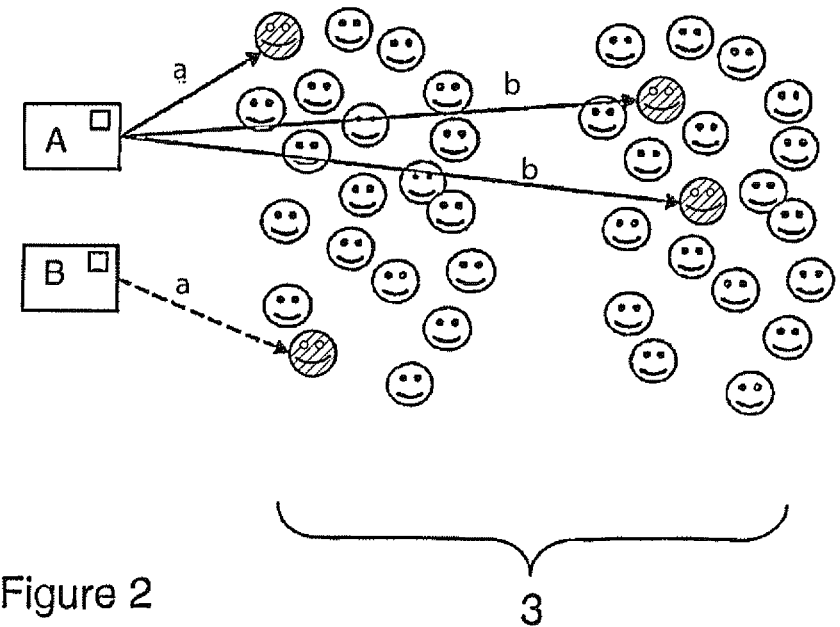
FIG. 2 is a schematic diagram showing how messages may be distributed to members of a user community over two or more rounds using a distribution rule.

In the present case, we propose starting with a similar initial round, i.e. by means of contacting an initial subset of the community 3. This can be done manually or automatically using bootstrapping rules, to be discussed below. By requesting feedback from this relatively small initial subset, the received feedback is used to determine characteristics of further distribution rounds, particularly membership in those rounds. Referring to FIG. 2, for example, we can apply a simple distribution rule to determine how the same two messages are propagated in further rounds. The distribution rule is defined as:

for all messages__received forward to one random__user
for 5 rounds
if any user nominates__spam then terminate
if any user nominates__handled then terminate
if any user nominates__target then forward to target

```
    forward to one random_user
    end for
```

As indicated in FIG. 2, the distribution rule is applied in the following way. Message A is sent to a random member. This member nominates a candidate recipient, or target, and so the message will be forwarded to that member in the next round. Message B is sent to a random user who nominates spam. This means that propagation of message B is terminated and will not be propagated further. Message A is sent to one further random member. In the following round, the two recipients of message A, i.e. the target and random members, respectively take no action and signal that the message is handled, thereby terminating further propagation of message A. By 'handled' we mean that the recipient is signalling that the query has already been dealt with. In this case, only one user, as opposed to four, was bothered by the spam message B and two, rather than three, members were bothered by an inappropriate message. This relatively simple example demonstrates how a relatively simple distribution rule, employing feedback from contacted members, can be used to control how the message is to be propagated subsequently. This enables messages to be propagated through limited subsets of the community 3 in a controlled and automated way with the aim of locating suitable recipients, e.g. members able to deal with a query, quickly and with minimal distribution to other members of the community.

In a given user community, each member will have rather different requirements from a messaging system. While a messaging system may be able to define an optimal distribution policy, using a particular distribution rule, for a particular application at a particular time, we propose a computer-implemented method and system which automatically optimize and adapt distribution policies. Such a method can offer particular advantages since (1) the space of possible distribution policies is very large and automated systems enable parts of this space to be explored and evaluated in terms of their effectiveness and (2) as the purpose of messaging systems change, adaption of distribution policies enables such changes to be incorporated in the same system without significant modification.

In order to adapt the distribution policies employed as the structure and maturity of a user community changes, the use of a mechanism similar to that discussed in "Automated Mechanism Design: A New Application Area for Search Algorithms", Proceedings of the International Conference on Principles and Practice of Constraint Programming (CP), Tuomas Sandholm, 2003, is considered to optimize and vary distribution rules depending on how successful the current rule(s) is/are. This can be performed by providing a plurality of distribution rules, each comprising a number of parameters or attributes capable of affecting distribution characteristics, and randomly varying those parameters over time and recording the performance of the propagation in respect of those parameters.

Typically, distribution rules may include the following parameters each of which can be modified:

Number of members in a subset;
    Number of rounds;
    Time between rounds;
    Number of responses before termination;
    Responses available to members in a subset and the actions resulting from their selection; and
    Time for response to be relevant to next subset selection.

Modification can be performed using simple randomization of a parameter or using alternative heuristic search methods. Alternatively, a knowledge based method could learn parameter settings to choose a distribution method based on characteristics of the community or characteristics of the message.

For example, a data message in the form of an email which includes a question comprising a large number of words might be most effectively answered by distributing it to relatively small subsets (in terms of number of members) in each round, using a large number of rounds. Alternatively, a question comprising a small number of words might be more effectively answered by distributing it in one or two rounds to large subsets of members, this providing just one round of community refinement before being closed.

Figure 3:
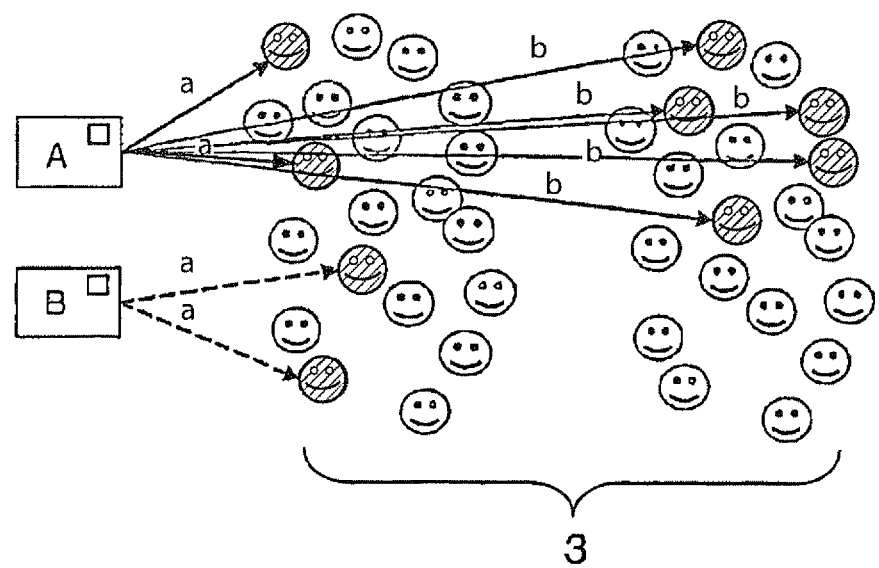
FIG. 3 is a schematic diagram showing the effect of changing the distribution rule used for the FIG. 2 process.

Referring to FIG. 3, the effect of changing one parameter in the distribution rule mentioned above in relation to FIG. 2 is shown. Here, the rule has been modified simply by changing the number of randomly selected users the message should be forwarded to. In this case, the result is considered worse than the original since more users have been spammed. In the method we propose, negative feedback received in respect of this particular message will result in the modified distribution rule being assigned a lower fitness measure than the original. As will be explained below, the fitness measure is applied to a further test to determine which distribution rule is used in relation to a subsequent message.

However, consider a change in circumstances. If knowledge as to how to handle the question in message A becomes rarer in the community, then a wider initial distribution of the message is more likely to result in a more rapid discovery of an appropriate target user. In the case where knowledge is relatively sparse, and time is more important than spam reduction, the modified distribution rule will begin to exhibit a higher fitness measure than the original rule.

New distribution rules can be developed by changing parameters of the current set of available distribution rules, i.e. those which are currently selectable. We propose testing a plurality of available distribution rules over time to determine their fitness measure. Those having a low fitness measure may be selected less frequently than those having a higher fitness and may be considered as candidates for removal more often. In this way, the list of available distribution rules will be regularly updated to reflect those mechanisms currently meeting the requirements of the messaging system.

Figure 4:
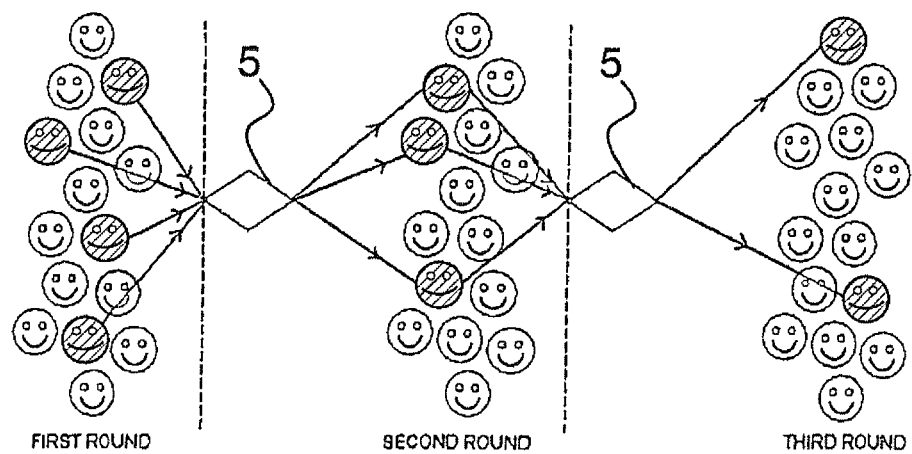
FIG. 4 is a schematic diagram showing the temporal process of distributing messages in different rounds in dependence on feedback.

Referring to FIG. 4, there is shown in schematic representation the basic temporal process of propagation through a user community 3 in accordance with the exemplary embodiment. Time is shown passing from left to right. The figure represents members of the community, those shown shaded being selected members of a subset in a round. In each round, members of the subset are prompted to provide feedback by means of selecting one of a plurality of available options. The resulting feedback is used to make decisions (indicated by the diamond shaped box 5) as to which members will receive the message in the subsequent round.

For ease of explanation, a number of definitions will now be clarified in relation to this example. The user community 3 comprises a set of registered members, a registered member being a user that has joined a messaging system and given permission to be contacted via a particular email address. A message event occurs when a member posts a message for propagation. Message events can be characterised by their content, the member who posted the message, the time when the message was posted, what mechanism is used to post the message and the context, or intent, of the posting. A candidate distribution rule is the distribution rule that has been selected to be applied to a particular message event to determine how it is to be distributed or propagated in the user community 3. A round is considered one iteration of the system in which a subset of members is sent a message and a minimum amount of feedback data received to determine membership of the next subset. So, a new round may commence when feedback is received from at least 60% of contacted members, up to a maximum of two hours, after which the next subset is decided.

As mentioned above, the members in a subset are prompted, via a web page or response buttons in an email window, to give feedback. For example, the available responses may be:

> This is offensive;
> This is not appropriate for me;
> This is a FAQ and has been answered;
> I would like to respond; and
> Noone knows this.

The members of a subset in each round are determined by applying a selected distribution rule that utilizes feedback from the previous subset. In selecting the first subset, there are no results to use in this subset formation and so bootstrap rules are used to create the initial subset, examples of which are:

> Select ten members at random; or
> Select the top ten users with an interest in this topic.

More sophisticated systems may apply personalization and social networking rules to the bootstrap selection, for example > Select users that are available for response at this time and have expressed an interest in this topic or responded to a post that another user who has this interest has also responded to.

The distribution rule selected for a message can define the bootstrap rule to be used. Beyond the initial round, selection criteria in the distribution rules use responses from the previous round to make decisions about subsequent subset membership. For example:

> If several members have selected "noone knows this" then select the member that has answered most questions labelled "noone knows this" in the past.
> Or
> "select users that have answered questions that have been answered by the users that answered in this round in previous instances".

The response rates of these options can also be used in the distribution rules (along with a nil response rate) to make decisions about criteria for membership in a subsequent round. The rules are applied and a subsequent round commenced when certain criteria have been met. The rule application criteria can use rules about absolute time passed or rules relative to the performance of the round in deciding when to commence the next round. For example, the rule application criteria might be:

> "Commence next round after two hours"
> or
> "Commence next round after 75% of the previous round population have responded"
> or
> "Commence next round when two of the previous round population have selected 'noone knows this'".

A distribution rule may also define termination criteria in order to end propagation of the particular message to which the rule is being applied. An example termination criterion is:

> "If more than one member has asserted that the question is offensive, halt further distribution, i.e. terminate."

Detailed Embodiment

Figure 5:
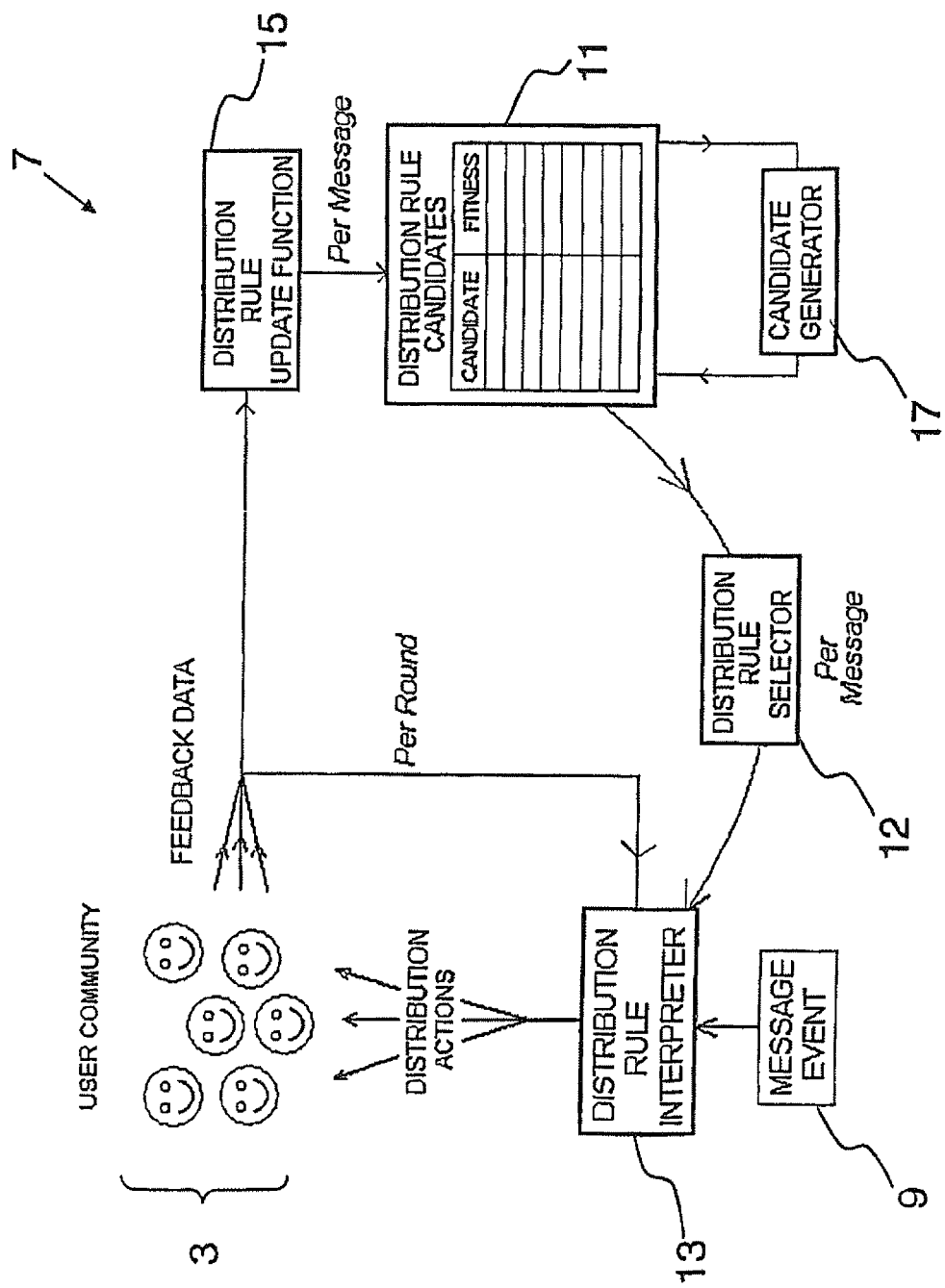
FIG. 5 is a block diagram showing the main functional elements of a messaging system arranged automatically to distribute messages to members of a user community.

A practical embodiment will now be described. Referring to FIG. 5, a messaging system 7 is shown comprising a number of functional components. Each component can be implemented as software, hardware or a combination of both. In this embodiment, all components are implemented in software stored on a central messaging server connected to a plurality of user terminals via respective network connections, the user terminals being operated by members of the user community 3. In use, members communicate with each other over the Internet via the messaging server which receives messages as so-called 'message events' and then propagates them in accordance with a selected distribution rule and feedback data received from recipients of each message.

There are two main datastructures represented in FIG. 5. The first is the message event 9 which is received from a user terminal. The message event 9 signals to the system that there is a message to handle. In addition, there is list of candidate distribution rules 11 stored in memory as a ranked list. Each candidate distribution rule has an associated fitness score which indicates how well that rule has performed in relation to previous distribution events as measured against some fitness metric. The distribution rule exhibiting the highest fitness score is ranked highest, the next highest score is ranked second and so on. The list has finite length and, as will be explained below, the list is periodically refreshed so that one candidate is replaced with another. The highest ranked distribution rule is considered the most useful, at least in relation to current objectives.

The processor of the messaging system 7 operates a number of software processes, namely a distribution rule selector 12, distribution rule interpreter 13, distribution rule update function 15, and distribution rule candidate generator 17. The prefix 'distribution rule' will be omitted in the remaining description.

Selector Process 12

The selector process 12 is responsible for selecting a rule from the candidate list 11. Selection is performed automatically in accordance with selection criteria to be explained below. The selected rule is applied to the next message event and its constituent parameters will determine factors such as determination of initial subset membership, number of rounds, time between rounds, number of responses before termination, responses available to members in a subset and actions resulting from their selection, time for response to be relevant to the next subset selection and so on.

There are two factors to consider when distributing a message. On the one hand, the expectation of the posting member for high performance from the system would usually lead to selection of the candidate having the highest fitness score. On the other hand, continued selection of that same rule candidate will prevent adaption. In this respect, a key advantage offered by this system is that, by testing the fitness of different distribution rules against objective performance criteria, over time the candidate list will develop automatically to contain the most efficient set of rules for that criteria. If the criteria were to change, e.g. if the speed of getting a positive response is more critical than spam reduction, then the candidate list will very likely change over time to reflect those rules more suited to achieving this criteria.

A number of techniques may be employed by the selector process 12 to aid adaption. A simple approach is to choose the fittest candidate the majority of the time and a random candidate for the remainder. So, the fittest candidate might be selected 99% of the time and a random candidate 1% of the time. Alternatively, the fittest candidate might be selected 80% of the time, the second fittest 15% of the time and a random candidate for the remaining 5%. A more complex approach is to detect a deterioration in the fittest candidate's score, at which time alternative candidates can be trialled. As the utility of the fittest candidate deteriorates, risks associated with Mailing an alternative also decrease. In addition, selection may be made on the basis of context or content of a message. For example, the utility of a candidate might be estimated to be lower when it is operated at a particular time of day; alternatively, some candidates might be especially useful for messages containing certain key words, but less useful when applied to others.

Interpreter Process 13

The interpreter process 13 is responsible for applying the selected distribution rule to a message event. This process is a virtual machine arranged to interpret instructions and parameters encoded in the selected rule and to execute them over an operational messaging infrastructure. It could be implemented as a rule engine or java interpreter. In use, the interpreter 13 reads the message event characteristics and the selected rule. It evaluates which clauses in the selected rule can be matched to the message event and then executes the associated action. A simple implementation can be achieved by writing a parser/interpreter using JavaCC. The parser is used to load data structures with information that is then used by a dispatcher to dictate the actions of a process which implements the rule(s) for the message event(s).

So, for example, if the selected rule specifies that the initial subset membership will comprise five members chosen at random, one role of the interpreter 13 is to perform this random selection from a list of all members. Had the rule said that initial membership will comprise five random members having 'engineer' in their job title, then the interpreter's role is to identify from a membership profile those members having the required job title and thereafter to select five at random. Since the selected rule will in practice specify other characteristics such as 'number of rounds', 'termination criteria', 'feedback options' and so on, the interpreter will also handle tasks such as keeping track of the number of rounds, monitoring feedback between rounds and so on. Regarding the latter, the interpreter process 13 is of course responsible for sending messages to each member of a subset, collating feedback data therefrom, identifying when criteria for a new round is met and membership of the next round based on the feedback.

Message Propagation Progress Signalling

Figure 6:
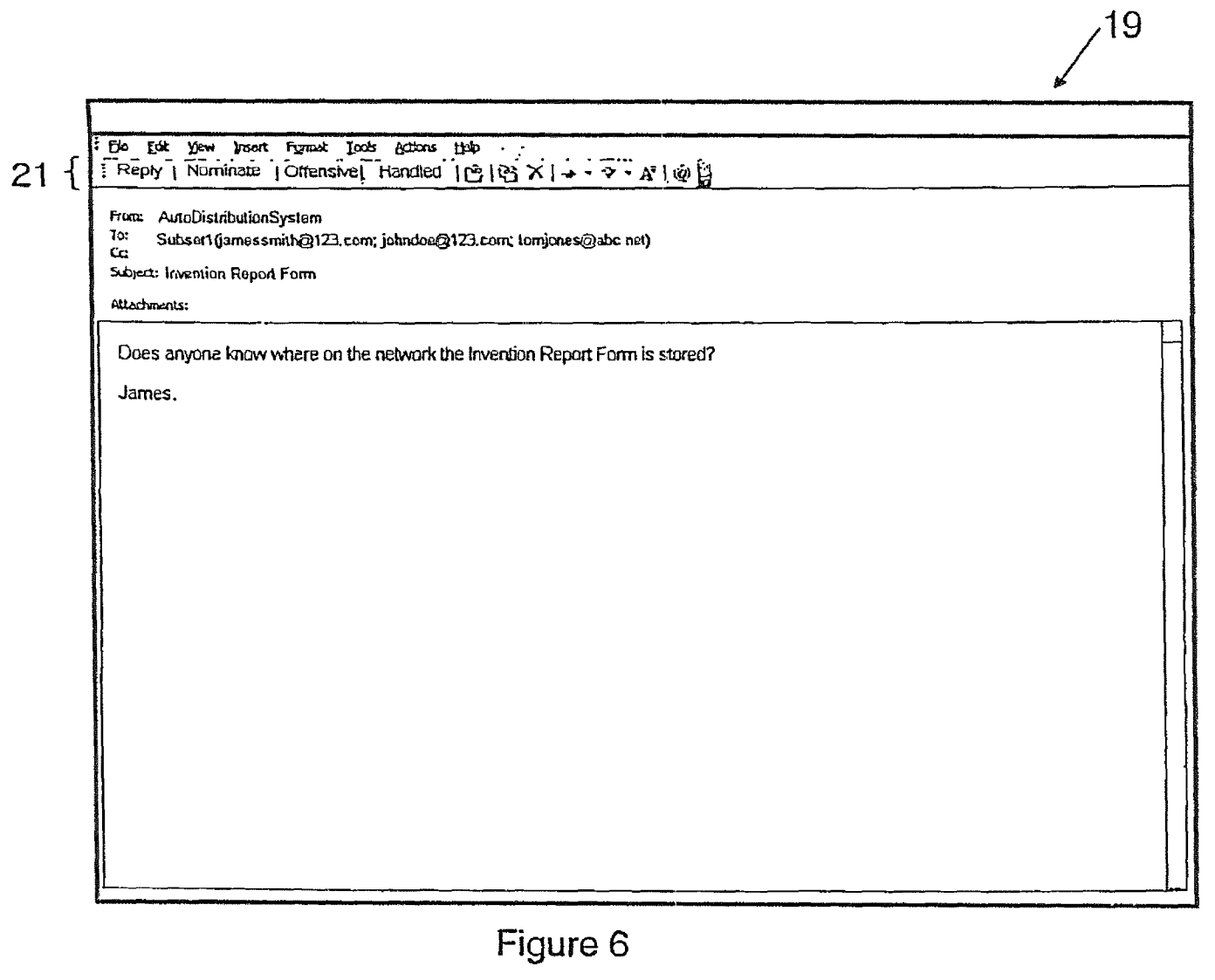

As mentioned previously, user feedback is requested in order to provide feedback data for the interpreter process 13. In this embodiment, feedback is prompted by means of displaying a plurality of feedback buttons as part of the message browsing window, e.g. as part of the user's email client. FIG. 6 shows an example screenshot 19 in which feedback options 21 are shown. When selected, representative feedback data is returned to the interpreter process 13 which applies the feedback to the selected rule. Depending on the rule, it may be that a single set of feedback data is sufficient to cause an action in the following round, e.g. one 'offensive' feedback might cause termination of further distribution, regardless of other feedback. On the other hand, the rule might use combined feedback data, i.e. returned from a plurality of users. In this case, the interpreter 13 might collect feedback data in terms of the percentage of users who have found a particular message offensive, termination only occurring if over 20% of users have responded in this way.

Update Function 15

As indicated in FIG. 5, the update function 15 also receives the feedback data and applies it against a fitness metric to generate a fitness score for the currently-selected rule. The purpose of the fitness score is to indicate how suitable said rule is for achieving a desired outcome, usually reflecting some aspect of messaging performance. In collating the various sets of feedback data made in relation to a message, the update function 15 will hold data such as how many members took a particular action, what actions individual members took, when they took that action and so on. This collated feedback data can then be compared with a fitness metric encoding the desired outcome to derive a score. A high score is given to distribution histories that closely match the desired outcome whilst a lower score indicates a significantly different outcome.

An example fitness metric is given by:

```
if (message distribution events > 5) && (message deletion events
    == 0)
        response time < 0.5
        response rounds < 3
    else
        message distribution events > 5
``` which can be interpreted to mean that if the feedback history matches 'distribution events greater than five with zero deletions' then the distribution rule used to propagate it is fit if these characteristics of the history (response time, rounds) are less than 0.5 and three respectively. If the history does not match the test, then the distribution rule is fit if the number of distribution events is greater than five. This would mean that if none ever deletes the message and there is a quick response, then the rule is good. However, if there is a deletion then the rule is good if there have been a lot of distributions, regardless of response time.

For example, if we take the previous example of message A, feedback data indicative of three propagation events and one deletion event is logged in the first round. In the second round, a further deletion event and a 'no propagation' event is logged. When evaluated against the above fitness metric, this results in a score of 1.0 in respect of this message event applied to this distribution rule. Rather than using a simple 1.0 and 0 score, a sliding scale could be used to account for near misses, e.g. by checking how many features are different in the result from the fitness function template, and how different they are. In the context of genetic programming, this is called the Hamming distance of the candidate from an idealized solution. The score is used to update the existing score stored against the particular distribution rule in the candidate list, as will be explained below.

Had the fitness metric been different, for example:

```
if (message distribution events > 5) && (message deletion events
== 0)
    response time < 0.5
    response rounds < 3
else
    message distribution events > 5
``` given the same history for message A then the score would not have been 1.0. There have been three propagation events and so the outcome will not exactly match the required criteria.

A number of options could be used to generate a meaningful score in this situation. For example, we could look at the average number of propagations and use this as a basis for deciding how different three propagations is from zero propagations. If, for example, an average of ten propagation events occurs for a message in the system then we can say that three is 30% different from zero, or use similar alternatives representing the difference. Using this approach, we could award a score of 0.7 for distribution rule 3 on message A.

Having generated a score in respect of a message event for a particular distribution rule, the next task of the update process is to update the overall fitness score for this rule. A simple way of performing this is to use a sliding window to disregard scores generated in the distant past and use only those generated within a recent time window to provide the cumulative score. Alternatively, we can weight the performance of the distribution rule against the weight of evidence collected on it. For example, we might test new scores against the entire population of previously collected scores in order to filter out scores which appear to be outliers in the population. Alternatively still, we might apply several distribution rules against a given message at once and normalize their scores against a difficulty assessment given their performance. If all tests applied to a particular message generate relatively poor scores then the message could be regarded as difficult to handle and so its weighting in evaluating the scores negatively could be reduced. On the other hand, if a mechanism performed particularly well on a message previously considered difficult, then it could be heavily weighted for positive reinforcement.

When the fitness score for the selected distribution rule has been updated, the list is updated to reflect any changes in rank.

Candidate Generator 17

The candidate generator 17 is arranged to refresh the list of rule candidates periodically. This is done in two ways. First, one or more candidate rules can be removed on the basis that it or they have a low fitness score. Second, the or each removed rule is replaced with a new rule that is subsequently trialled to generate a fitness score.

The first task is straightforward to implement. Periodically, the candidate generator 17 deletes one or more rules sitting at the bottom of the candidate list ranking. For example, the entire bottom half of the list might be deleted. Refinements might involve filtering, for example by removing only those rules in the ranking that are statistically worse than the median fitness member of the population, or that are worse than the bottom member of the top quartile.

Generating the or each replacement rule is more complicated. Two possible implementations have been considered.

First, existing candidate rule parameters can be adapted. For example, consider the rule:

```
for all message_received forward to 1 random_user
    for 5 rounds
        if > or = 1 nominates_spam then terminate
        if > or = 1 nominates_handled then terminate
        if > or = 1 nominates_target forward to target
        forward to 1 random_user
    end for.
```

In the above rule, any one of the underlined parameters could be adapted to generate a new rule for introduction to the candidate list. The adaption of parameters is performed automatically and may use a Gaussian function or simple randomizer to determine what parameter is changed and to what value. Gaussian adaption is preferred because the incremental change in the nature of the candidate rule makes the process more like a parallel hill climbing search and, if the search space is coherent in nature and provides feedback for the rule, this enables optimization to occur.

An example adaption of the above rule might simply involve changing the first 1 to 2. Although a very minor alteration in the original rule, it might prove more fit for purpose than the original. Using a Gaussian approach will mean that smaller changes in parameter values is more likely, but over a large number of adaptions the parameters will be adapted by a relatively large amount. Such techniques are discussed in relation to genetic searching in "The Design of Innovation: Lessons from and for Competent Genetic Algorithms" by David Goldberg, Kluwer Academic Publishers, 2002, ISBN 1402070985.

A more ambitious approach may use parse trees of the candidate rules to facilitate meaningful changes in their structure. Variation may be introduced by replication or deletion of structures. The structures can also be randomly perturbed as in the first approach mentioned above. For example, taking the above mentioned candidate rule, replication of one subtree would yield:

```
for all message_received forward to 2 random_user
    for 5 rounds
        if > or = 1 nominates_spam then terminate
        if > or = 1 nominates_handled then terminate
        if > or = 1 nominates_target forward to target
        forward to 1 random_user
    end for
    for 5 rounds
        if > or = 1 nominates_spam then terminate
        if •1 nominates_handled then terminate
        if •1 nominates_target forward to target
        forward to 1 random_user
    end for.
```

Alternatively, replication of another would yield:

```
for all message_received forward to 2 random_user
for all message_received forward to 2 random_user
    for 5 rounds
        if > or = 1 nominates_spam then terminate
        if > or = 1 nominates_handled then terminate
        if > or = 1 nominates_target forward to target
        forward to 1 random_user
    end for.
```

Both variations are valid and produce significant variations in the functionality of the message distribution system. Subtrees can be crossed over to generate blended candidate mechanisms as well. Such techniques have been developed in the genetic programming community and are introduced in "Genetic Programming: A Paradigm for Genetically Breeding Populations of Computer Programs to Solve Problems" by J Koza, Technical Report 1314, 1990, University of Stanford Department of Computer Science.

Figure 7:
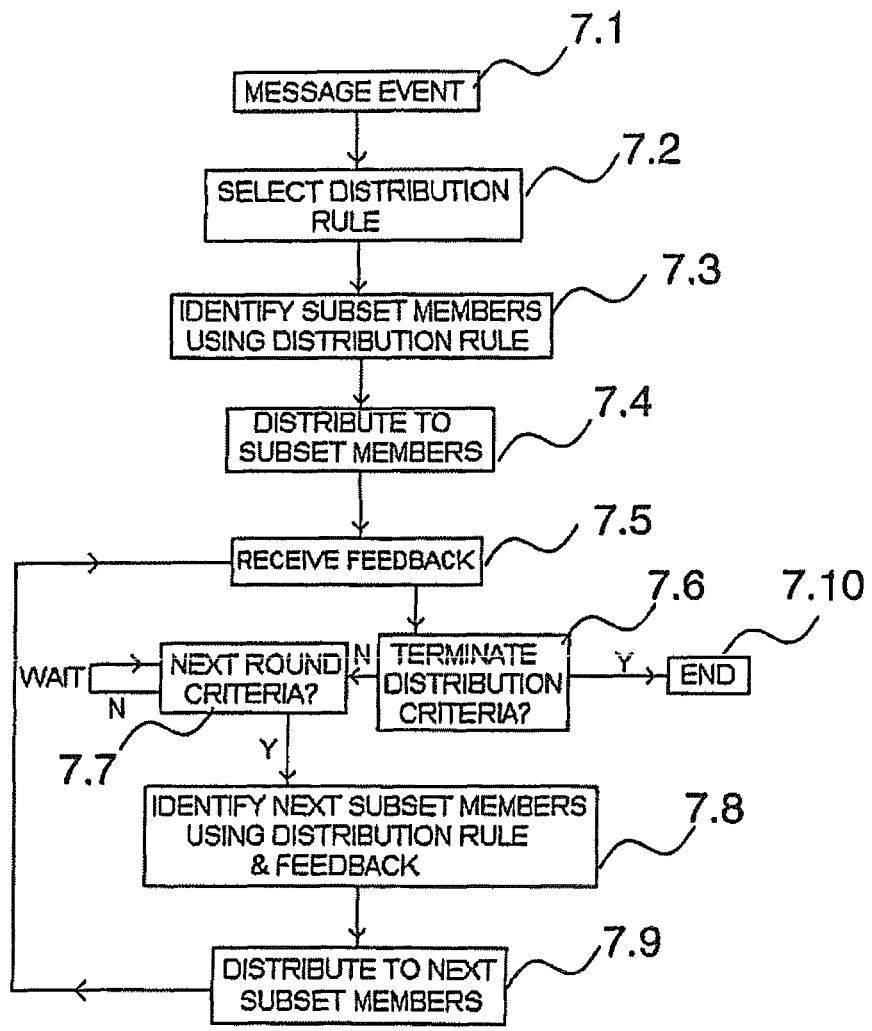
FIG. 7 is a flow diagram showing the main processing stages employed by the messaging system shown in FIG. 5.

Referring to FIG. 7, the main processing steps performed by the messaging system 7 shown and described with respect to FIG. 5 are shown as a flow diagram. In an initial step 7.1, the next message event 9 is received. In step 7.2, a distribution rule is selected from the candidate list 11 in accordance with the rule selector process 12. In the next step 7.3, the rule interpreter 13 applies the selected distribution rule to determine the initial subset of members who will receive the message. In step 7.4, the message is distributed to the initial membership, e.g. by e-mail. In step 7.5, feedback from one or more of the initial membership is received. The selected distribution rule will define feedback criteria for determining (a) when the next round can commence and (b) when to terminate distribution. In step 7.6, the feedback is checked against the termination criteria and, assuming this is not met, in step 7.7, the next round criteria is tested. When the next round criteria is met, in step 7.8, membership of the next subset is determined using the selected distribution rule and the feedback. In step 7.9, the message is distributed in the next round to the next set of members and the process repeats until the termination criteria is met, at which time further distribution is terminated in step 7.10.

The above processing steps are performed automatically by the messaging system 7 in response to a message event 9. In addition, the update function 15, candidate generator 17 and rule selector 12 operate automatically and collectively to update and select rule candidates with the aim of providing efficient and optimized propagation of messages through a user community.

The invention claimed is:

1. A computer-implemented method for distributing data messages to members of a user community over a data network, the method comprising:
using at least one computer system configured to
(a) store a plurality of distribution rules, each rule comprising a respective set of instructions enabling a data processor to determine subsets of members to whom a data message is to be transmitted;
(b) select a first distribution rule and send a first data message to a first subset of members over said data network in accordance with said first rule;
(c) receive feedback data in respect of the first data message from one or more of the first subset of members; and
(d) automatically select a second distribution rule from the plurality of distribution rules in dependence on the feedback data received in (c) in respect of the first data message, the selected second rule being a rule which meets a predefined criterion or criteria based on the received feedback, the selected second rule being assigned for use in sending a second data message to a second, different, subset of members over said data network.

2. A method according to claim 1, wherein step (b) comprises sending the first data message to different subsets of members in respective distribution rounds, selection of the second distribution rule in (d) being dependent on feedback data received in respect of each round.

3. A method according to claim 2, wherein the distribution rules determine which members comprise respective member subsets in dependence on feedback data received in respect of a previous distribution round.

4. A method according to claim 1, in which the stored distribution rules are ranked to reflect a fitness score calculated for each rule in accordance with the received feedback data, the predetermined criterion defining which rank in the list which is selected for application with the second data message.

5. A method according to claim 1, in which a new distribution rule is automatically added to the existing plurality of distribution rules prior to sending the second, subsequent, message.

6. A method according to claim 5, in which the new distribution rule replaces one of the distribution rules in the existing plurality of distribution rules according to a predetermined replacement rule.

7. A method according to claim 6, in which the replaced distribution rule is that which has the lowest fitness score.

8. A method according to claim 5, in which the new distribution rule is generated automatically using a rule generating algorithm and comprises one or more modified attributes of an existing distribution rule.

9. A computer-implemented method for distributing data messages to members of a user community over a data network, the method comprising:
using at least one computer system configured to
(a) store a plurality of distribution rules, each rule being arranged, when executed by a data processor, to determine a subset of members to whom a message is to be transmitted in dependence on feedback data received from one or more other members in respect of a particular message;
(b) select a first distribution rule;
(c) send a first data message to different subsets of the user community in respective distribution rounds, members in at least one round being prompted to provide feedback data in respect of the data message, receipt of feedback data being used by a data processor in association with the first distribution rule automatically to determine the subset of members to whom the message is sent in a subsequent round; and
(d) select a different distribution rule from the plurality of distribution rules for use in sending a second, subsequent, data message over the data network, selection of the different distribution rule being dependent on a predetermined rule selection algorithm which takes as input the feedback data received in respect of each round of the first message and which selects a rule which meets a predefined criterion or criteria based on the received feedback.

10. A computer program stored on a non-transitory computer-readable medium, the computer program comprising instructions which, when executed, cause a processor to perform the steps defined in claim 1.

11. A system arranged to distribute messages to members of a user community using a data network, the system comprising:
at least one processor including
means configured to access a plurality of distribution rules for determining a subset of members to whom a message is to be transmitted;
selecting means configured to select a first distribution rule and to send a first message to a first subset of members in accordance with said first rule;

means configured to receive feedback data in respect of first message from one or more of the first subset of members; and means configured automatically to select a second distribution rule from the plurality of distribution rules in dependence on the feedback data received and to send a second message to a different subset of members in accordance with said second rule, said second rule being selected as a rule meeting a predefined criterion or criteria based on the received feedback.

* * * * *